United States Patent
Duan

(10) Patent No.: US 7,463,755 B2
(45) Date of Patent: Dec. 9, 2008

(54) METHOD FOR CORRECTING MOTION VECTOR ERRORS CAUSED BY CAMERA PANNING

(75) Inventor: Dongpu Duan, Nanjing (CN)

(73) Assignee: Qisda Corporation, Taoyuan County (TW)

( * ) Notice: Subject to any disclaimer, the term of this patent is extended or adjusted under 35 U.S.C. 154(b) by 808 days.

(21) Appl. No.: 10/711,858

(22) Filed: Oct. 10, 2004

(65) Prior Publication Data

US 2006/0087563 A1 Apr. 27, 2006

(51) Int. Cl.
G06K 9/00 (2006.01)
G06K 9/46 (2006.01)
H04N 7/12 (2006.01)
H04N 5/14 (2006.01)
H04B 1/66 (2006.01)

(52) U.S. Cl. .............. 382/107; 382/236; 348/402.1; 348/420.1; 348/700; 375/240.27

(58) Field of Classification Search ............... 382/107, 382/236; 375/240.27; 348/402.1, 420.1, 348/700
See application file for complete search history.

(56) References Cited

U.S. PATENT DOCUMENTS

| | | | | |
|---|---|---|---|---|
| 4,965,666 A * | 10/1990 | Haghiri | ...................... | 348/699 |
| 5,808,678 A * | 9/1998 | Sakaegi | ................. | 348/333.03 |
| 6,144,405 A * | 11/2000 | Toba | ...................... | 348/208.4 |
| 6,160,917 A * | 12/2000 | Sommer | ..................... | 382/236 |
| 6,327,391 B1 * | 12/2001 | Ohnishi et al. | .............. | 382/236 |
| 6,608,866 B1 * | 8/2003 | Saunders et al. | ....... | 375/240.16 |
| 6,734,902 B1 * | 5/2004 | Kawahara | ................ | 348/208.8 |
| 6,754,278 B1 * | 6/2004 | Suh et al. | ............... | 375/240.27 |
| 6,952,449 B2 * | 10/2005 | Kawada et al. | ......... | 375/240.16 |
| 7,024,040 B1 * | 4/2006 | Itokawa | ...................... | 382/199 |
| 7,221,710 B2 * | 5/2007 | Lee | ....................... | 375/240.29 |
| 7,239,662 B2 * | 7/2007 | Horowitz et al. | ....... | 375/240.24 |
| 7,251,278 B1 * | 7/2007 | Valli | ..................... | 375/240.12 |
| 2001/0031004 A1 * | 10/2001 | Kim et al. | .............. | 375/240.16 |
| 2002/0126752 A1 * | 9/2002 | Kim | ...................... | 375/240.03 |
| 2004/0202252 A1 * | 10/2004 | Lee | ...................... | 375/240.27 |
| 2005/0018772 A1 * | 1/2005 | Sung et al. | ............. | 375/240.16 |
| 2007/0064812 A1 * | 3/2007 | Baik | ..................... | 375/240.27 |
| 2007/0086527 A1 * | 4/2007 | Yan | ....................... | 375/240.24 |

OTHER PUBLICATIONS

Ghanbari, Standard Codecs: image compression to advanced video coding, 2003, institution electrical engineers, pp. 266-268.*

* cited by examiner

*Primary Examiner*—Jingge Wu
*Assistant Examiner*—Kathleen S Yuan

(57) ABSTRACT

A method of correcting errors in motion vectors due to camera panning includes identifying an error block that contains an error motion vector out of a plurality of blocks in a current video frame, each block in the current video frame containing a corresponding motion vector. The method also includes calculating an average motion vector value of the motion vectors for all blocks in the current video frame that are not error blocks, identifying a group of effective motion vectors in the current video frame having corresponding motion vector values within a threshold value of the average motion vector value, calculating a panning motion vector value to be equal to an average value of the effective motion vectors, and correcting the error block by setting the motion vector of the error block to be equal to the panning motion vector value.

10 Claims, 4 Drawing Sheets

METHOD FOR CORRECTING MOTION VECTOR ERRORS CAUSED BY CAMERA PANNING

BACKGROUND OF INVENTION

1. Field of the Invention

The present invention relates to a method of correcting motion vectors, and more specifically, to a method of correcting motion vector errors in video frames caused by camera panning.

2. Description of the Prior Art

Video frames are composed of a plurality of blocks. In some movies and films, camera-panning skills are used to take a panorama shot or to generate special filming effects. For instance, the MPEG-4 video coding standard is becoming a popular video format. In this video format, video frames are always partitioned into a set of blocks. Since there is information redundancy among video frames over time, one block in the current frame may be quite similar with some area of pixels in the previous frame. One motion vector is coded to present the position offset between them for each block in the current frame.

Unfortunately, when transmitting video signals, errors may occur and cause a loss of some motion vectors. Blocks in the video frame that contain errors are referred to as error blocks. The presence of error blocks degrades the video quality, and leads to a less crisp picture.

SUMMARY OF INVENTION

It is therefore an objective of the claimed invention to provide a method of correcting motion vector errors experienced during camera panning in order to solve the above-mentioned problems.

According to the claimed invention, a method of correcting errors in motion vectors due to camera panning includes identifying an error block that contains an error motion vector out of a plurality of blocks in a current video frame, each block in the current video frame containing a corresponding motion vector, calculating an average motion vector value of the motion vectors for all blocks in the current video frame that are not error blocks, identifying a group of effective motion vectors by counting blocks in the current video frame having corresponding motion vector values within a first range of values bounded by the average motion vector value minus a first threshold value and the average motion vector value plus the first threshold value, calculating a panning motion vector value to be equal to an average value of the effective motion vectors, and correcting the error block by setting the motion vector of the error block to be equal to the panning motion vector value.

It is an advantage of the claimed invention that the motion vector of the error block can be corrected based on the motion vector values of the other blocks in the video frame. All of the blocks in the same video frame should have similar motion characteristics, and therefore the error block can be corrected with a high degree of confidence.

These and other objectives of the present invention will no doubt become obvious to those of ordinary skill in the art after reading the following detailed description of the preferred embodiment that is illustrated in the various figures and drawings.

DETAILED DESCRIPTION

The present invention aims to correct errors in motion vectors caused by camera panning. The present invention corrects the motion vector errors by replacing the motion vector of an error block with the panning vector value of the current video frame.

The pixels and blocks in video frames shot using camera panning have the same or similar motion characteristics. The present invention relies on this characteristic to recover the motion vector of the error block.

Figure 1:
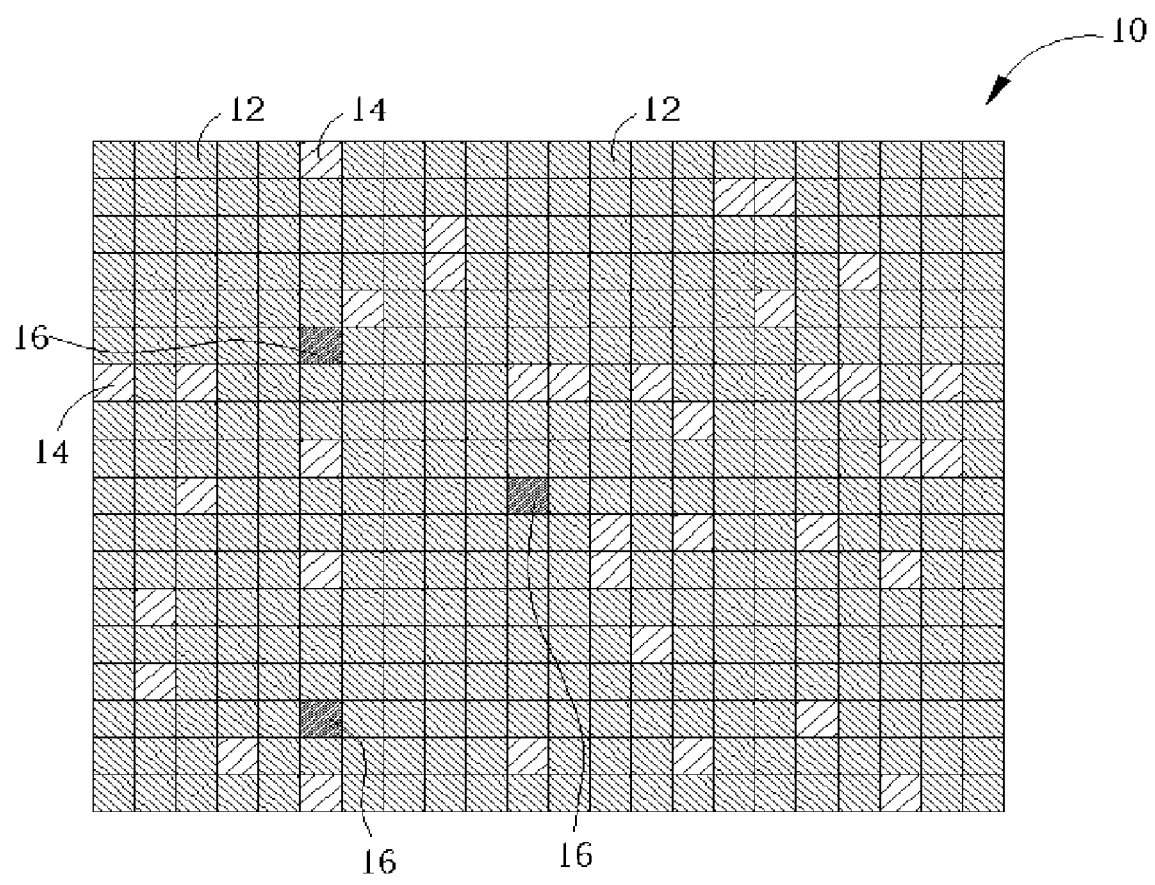
FIG. 1 is a diagram of a video frame containing error blocks.
Figure 2:
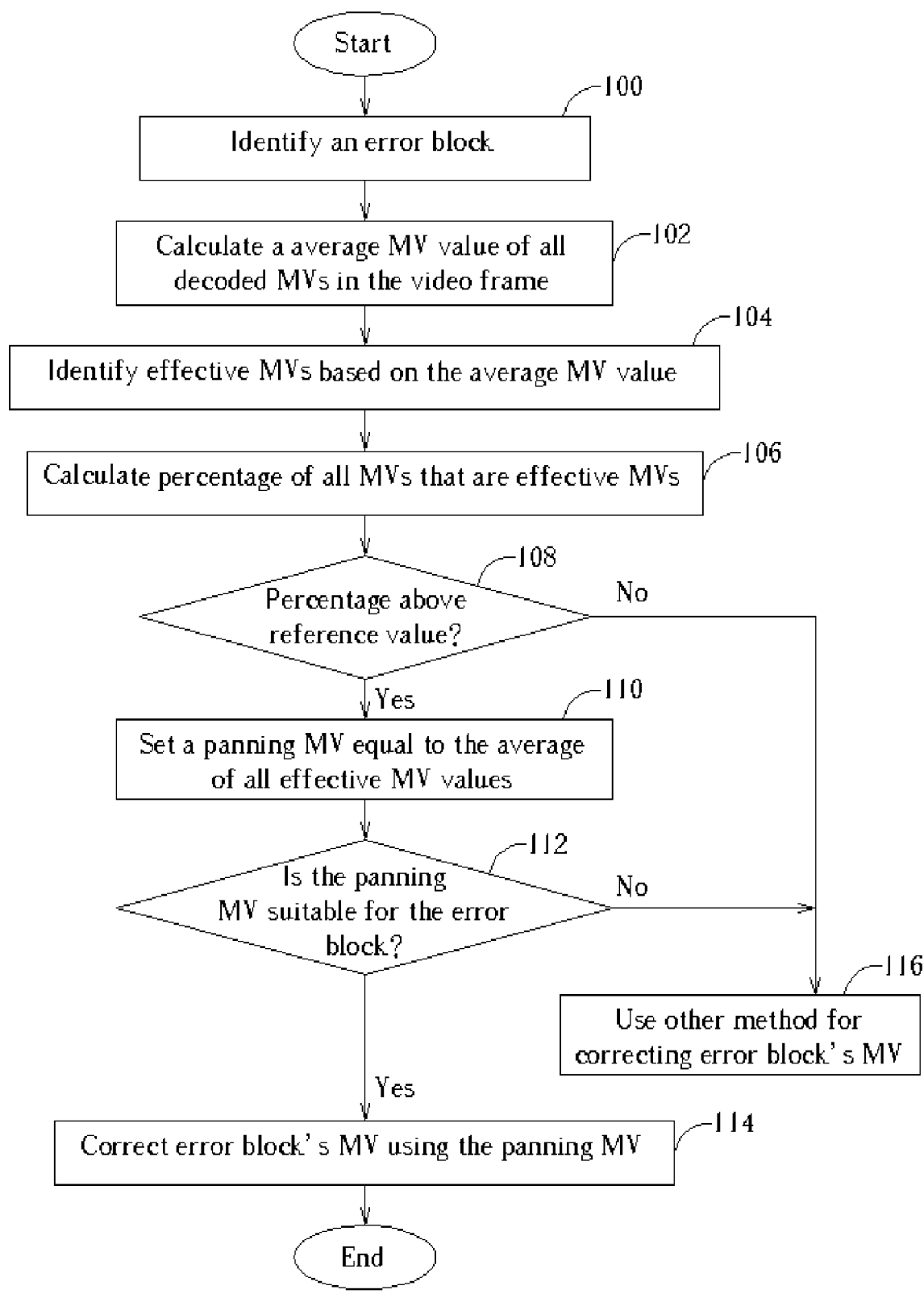
FIG. 2 is a flowchart illustrating a method of correcting the error blocks according to a first embodiment of the present invention.

Please refer to FIG. 1 and FIG. 2. FIG. 1 is a diagram of a video frame 10 containing error blocks 16. FIG. 2 is a flowchart illustrating a method of correcting the error blocks 16 according to a first embodiment of the present invention. The video frame contains a plurality of blocks, each of the blocks containing a respective motion vector. Steps contained in the flowchart will be explained below.

Step 100: Identify error blocks 16 that contain an error motion vector;

Step 102: Calculate an average motion vector value AVG of all decoded motion vectors in the video frame 10. That is, for all of the blocks in the video frame 10 which are not error blocks 16, calculate the average of the motion vector values;

Step 104: Identify a group of effective motion vectors 12. The effective motion vectors 12 are defined as those motion vectors falling in the range [AVG−THRESHOLD1, AVG+THRESHOLD1]. All other motion vectors can be labeled as non-effective motion vectors 14, meaning that they do not fall within this range;

Step 106: Calculate a percentage of all the motion vectors in the video frame 10 that are effective motion vectors 12;

Step 108: Determine if the percentage of effective motion vectors 12 is above a reference value; if so, go to step 110; if not, go to step 116;

Step 110: Set a panning motion vector value PANNING to be equal to the average of all effective motion vector values 12;

Step 112: Determine if the panning motion vector value PANNING is suitable for correcting the error block 16. This can be performed by calculating an average motion vector value or a median motion vector value of four or eight blocks surrounding the error block 16 to be corrected. If the average or median motion vector value for the surrounding blocks is within the range [PANNING−THRESHOLD2, PANNING+THRESHOLD2], the panning motion vector value PANNING is said to be suitable for correcting the motion vector of the error block 16, and the flow proceeds to step 114; Otherwise, go to step 116;

Step 114: Correct the motion vector of the error block 16 to have the panning motion vector value PANNING; and Step 116: Use another method for correcting the motion vector of the error block 16.

As shown in FIG. 1, the motion vectors of the three error blocks 16 can all be corrected to be the panning motion vector value PANNING. This of course assumes that the percentage of effective motion vectors 12 is above a reference value and that the four or eight blocks surrounding each of the error blocks 16 have motion vector values within a second threshold value THRESHOLD2 of the panning motion vector value PANNING. The percentage of effective motion vectors 12 is preferably set equal to 70-90%. Additionally, the first and second thresholds THRESHOLD1 and THRESHOLD2 can have values of between 0.5 and 3. Of course, these values are only provided for illustrative purposes, and by no means limit the scope of the present invention.

In the first embodiment of the present invention described above, the video frame 10 is taken as a whole, and is not divided into sections for correcting each of the error blocks 16. Therefore, the error blocks 16 that are corrected will be corrected to have their motion vector values set equal to the panning motion vector value PANNING.

Figure 3:
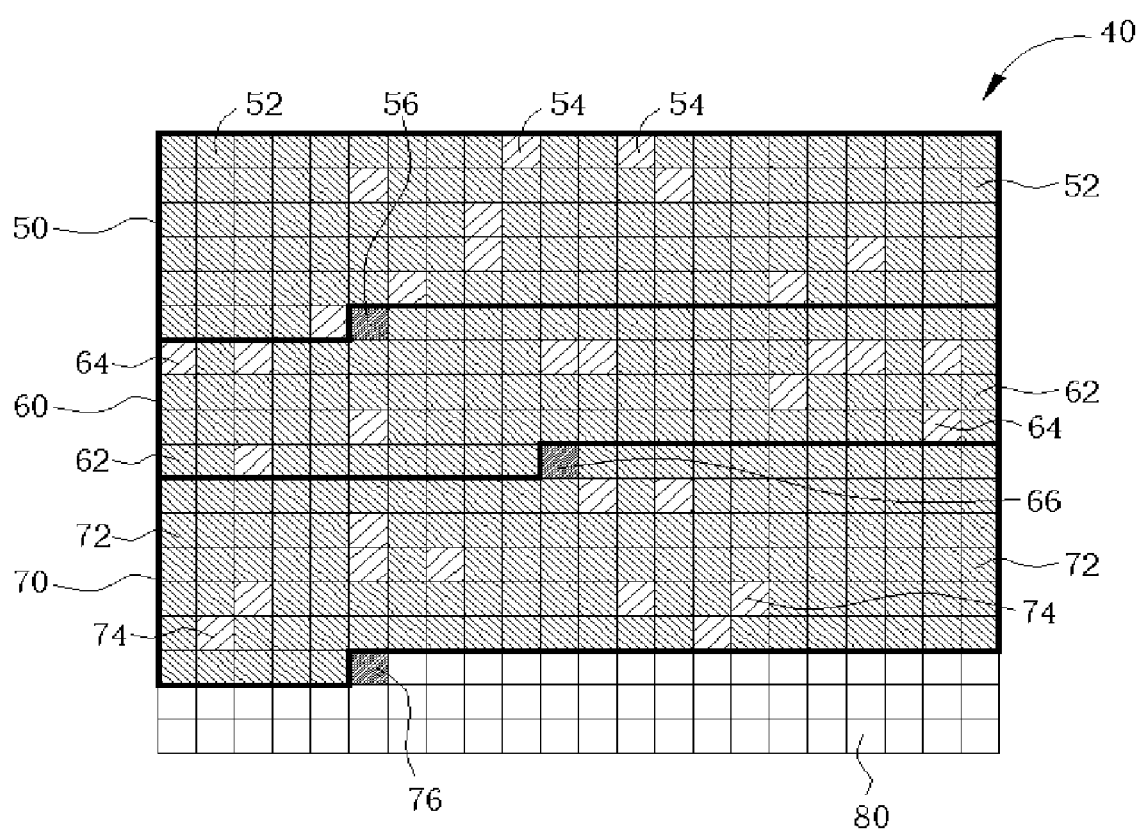
FIG. 3 is a diagram of another video frame containing error blocks.
Figure 4:
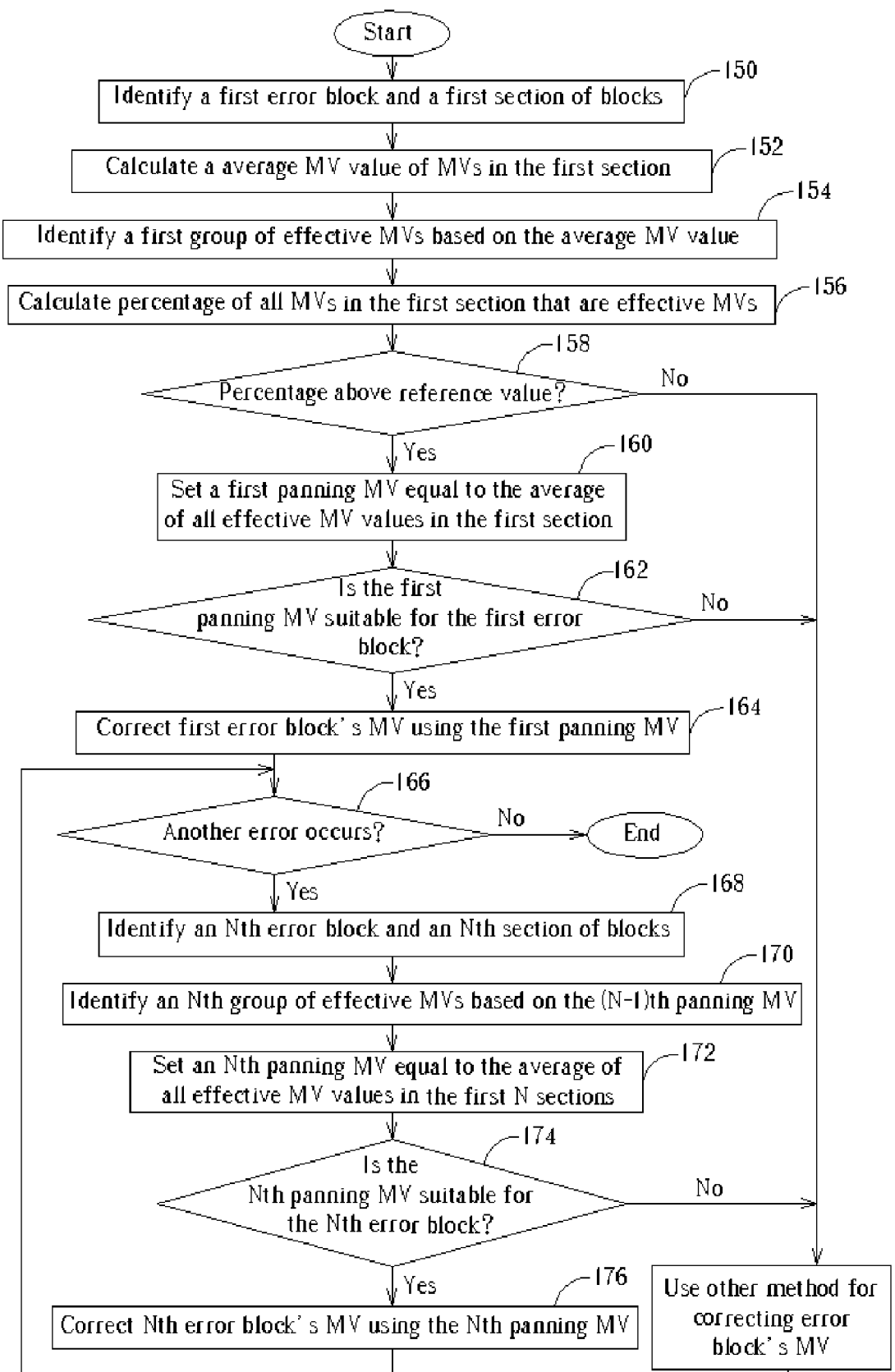
FIG. 4 is a flowchart illustrating a method of correcting the error blocks according to a second embodiment of the present invention.

Please refer to FIG. 3 and FIG. 4. FIG. 3 is a diagram of a video frame 40 containing error blocks 56, 66, and 76. FIG. 4 is a flowchart illustrating a method of correcting the error blocks 56, 66, and 76 according to a second embodiment of the present invention. Unlike the first embodiment, the second embodiment updates panning motion vector values with each iteration of the method. Steps contained in the flowchart will be explained below.

Step 150: Identify a first error block 56 that contains an error motion vector. Also, identify a first section 50 of blocks that is located before the first error block 56. The first section 50 of blocks are blocks located in rows above the first error block 56 and the blocks located to the left of the first error block 56 in the same row as the first error block 56;

Step 152: Calculate an average motion vector value AVG1 of all decoded motion vectors in the first section 50;

Step 154: Identify a first group of effective motion vectors 52. The effective motion vectors 52 are defined as those motion vectors in the first section 50 falling in the range [AVG1−THRESHOLD1, AVG1+THRESHOLD1]. All other motion vectors in the first section 50 can be labeled as non-effective motion vectors 54, meaning that they do not fall within this range;

Step 156: Calculate a percentage of all the motion vectors in the first section 50 of the video frame 40 that are effective motion vectors 52;

Step 158: Determine if the percentage of effective motion vectors 52 is above a reference value; if so, go to step 160; if not, go to step 178;

Step 160: Set a first panning motion vector value PANNING(1) to be equal to the average of all effective motion vector values 52 in the first section 50;

Step 162: Determine if the first panning motion vector value PANNING(1) is suitable for correcting the first error block 56. This can be performed by calculating an average motion vector value or a median motion vector value of four or eight blocks surrounding the first error block 56. If the average or median motion vector value for the surrounding blocks is within the range [PANNING(1)−THRESHOLD2, PANNING(1)+THRESHOLD2], the first panning motion vector value PANNING(1) is said to be suitable for correcting the motion vector of the first error block 56, and the flow proceeds to step 164; Otherwise, go to step 178;

Step 164: Correct the motion vector of the first error block 56 to have the first panning motion vector value PANNING(1);

Step 166: Determine if there is another error block in the video frame 40; if so, go to step 168; if not, end the process;

Step 168: Identify an Nth error block 66, 76 that contains an error motion vector. The variable N represents an integer greater than or equal to 2 since the first error block has already been corrected at this point. Also, identify an Nth section 60, 70 of blocks, each of which is located before the Nth error block 66, 76. In the example shown in FIG. 3, N can equal 2 or 3 since the video frame 40 in FIG. 3 only contains a second section 60 and a third section 70;

Step 170: Identify an Nth group of effective motion vectors 62, 72. The effective motion vectors 62, 72 are defined as those motion vectors in the Nth section 60, 70 falling in the range [PANNING(N−1)−THRESHOLD2, PANNING(N−1)+THRESHOLD2]. All other motion vectors in the Nth section 60, 70 can be labeled as non-effective motion vectors 64, 74, meaning that they do not fall within this range;

Step 172: Set an Nth panning motion vector value PANNING(N) to be equal to the average of all effective motion vector values 52, 62, 72 in the first N sections 50, 60, 70;

Step 174: Determine if the Nth panning motion vector value PANNING(N) is suitable for correcting the Nth error block 66, 76. This can be performed by calculating an average motion vector value or a median motion vector value of four or eight blocks surrounding the Nth error block 66, 76. If the average or median motion vector value for the surrounding blocks is within the range [PANNING(N)−THRESHOLD2, PANNING(N)+THRESHOLD2], the Nth panning motion vector value PANNING(N) is said to be suitable for correcting the motion vector of the Nth error block 66, 76, and the flow proceeds to step 176; Otherwise, go to step 178;

Step 176: Correct the motion vector of the Nth error block 66, 76 to have the Nth panning motion vector value PANNING(N), go back to step 166;

Step 178: Use another method for correcting the motion vector of the current error block.

As shown in FIG. 3, the three sections 50, 60, and 70 of the video frame 40 precede the three error blocks 56, 66, 76. Since there are only three error blocks 56, 66, 76 shown in the video frame 40, a plurality of blocks 80 located after the third error block 76 are not used for correcting the motion vector values of the error blocks 56, 66, 76. By dividing the video frame 40 into a plurality of sections, the various error blocks contained in the video frame 40 can each be corrected with unique motion vector values, thereby providing a more realistic and accurate correction for the error blocks. Conveniently, the same example threshold values and example percentage used in the first embodiment of the present invention may also be used with the second embodiment, although these are not intended as limiting.

In steps 112, 162, and 174 above, the motion vector values in four or eight neighboring macro blocks (MBs) of the error MB are used to decide whether the panning motion vector (MV) value is suitable for correcting the error MB.

As described in video standards, the MV value is set for each block only in the Y channel and no MV is set for the blocks in the U and V channels. Therefore, the motion vector info for the block in the U and V channels is calculated from that in the Y channel.

Since one MB in the Y channel contains four blocks, which are the smallest available unit for MV coding, the four MV values are coded for one MB. When an error occurs in one MB and causes the loss of MV info, the four MVs for that MB will all be lost as a result of the error propagation in the video bit stream. Therefore, in the example in which four neighboring MBs are used, 16 total MVs from the four neighboring MBs are used for the decision of panning MV suitability. Similarly, 32 total MVs can be used if eight neighboring MBs are used instead of four neighboring MBs.

In summary, the present invention corrects the motion vector of an error block based on the motion vector values of the other blocks in the video frame. Since all of the blocks in the same video frame have similar motion characteristics, the error block can be corrected with a high degree of confidence. The present invention method is both simple to implement and improves the overall video quality considerably when errors are present in motion vectors caused by camera panning in video frames.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of correcting errors in motion vectors due to camera panning, the method comprising steps:
   (a) identifying a first error block that contains an error motion vector out of a plurality of blocks in a current video frame, each block in the current video frame containing a corresponding motion vector;
   (b) calculating a first average motion vector value of the motion vectors for all blocks located in a first section of the current video frame, the first section of blocks being all of the blocks in the current video frame that are located before the first error block;
   (c) identifying a first group of effective motion vectors by counting blocks in the first section of the current video frame having corresponding motion vector values within a first range of values bounded by the first average motion vector value minus a first threshold value and the first average motion vector value plus the first threshold value;
   (d) calculating a first panning motion vector value to be equal to an average value of the first group of effective motion vectors; and
   (e) correcting the first error block by setting the motion vector of the first error block to be equal to the first panning motion vector value.

2. The method of claim 1, further comprising steps:
   (c1) calculating a percentage of all of the motion vectors in the first section of the current video frame which are effective motion vectors; and
   (c2) proceeding with steps (d) and (e) only if the percentage is above a predetermined percentage value.

3. The method of claim 2, wherein the predetermined percentage value is in the range of 70% to 90%.

4. The method of claim 1, further comprising steps:
   (d1) calculating a second average motion vector value of motion vectors corresponding to a plurality of neighboring blocks surrounding the first error block;
   (d2) determining if the second average motion vector value is within a second range of values bounded by the first panning motion vector value minus a second threshold value and the first panning motion vector value plus the second threshold value; and
   (d3) proceeding with step (e) only if the second average motion vector value is within the second range of values.

5. The method of claim 4, wherein four neighboring blocks are used for calculating the second average motion vector value.

6. The method of claim 4, wherein eight neighboring blocks are used for calculating the second average motion vector value.

7. The method of claim 1, further comprising steps:
   (d1) calculating a median motion vector value of motion vectors corresponding to a plurality of neighboring blocks surrounding the first error block;
   (d2) determining if the median motion vector value is within a second range of values bounded by the first panning motion vector value minus a second threshold value and the first panning motion vector value plus the second threshold value; and
   (d3) proceeding with step (e) only if the median motion vector value is within the second range of values.

8. The method of claim 7, wherein the first and second threshold values are in the range of 0.5 to 3.

9. The method of claim 1, further comprising steps:
   (f) identifying an Nth error block and an Nth section of blocks in the current video frame that are located between an (N−1)th error block and the Nth error block, N being an integer equal to or greater than 2;
   (g) identifying an Nth group of effective motion vectors by counting blocks in the Nth section of the current video frame having corresponding motion vector values within an Nth range of values bounded by the (N−1)th panning motion vector value minus a second threshold value and the (N−1)th panning motion vector value plus the second threshold value;
   (h) calculating an Nth panning motion vector value to be equal to an average value of the first N groups of effective motion vectors;
   (i) correcting the Nth error block by setting the motion vector of the Nth error block to be equal to the Nth panning motion vector value; and
   (j) repeating steps (f) through (i) until no more error blocks exist in the current video frame.

10. The method of claim 1, wherein the first section of blocks are located in rows above the first error block and are located left of the first error block and in a same row as the first error block.

* * * * *